United States Patent
Santicchi

(10) Patent No.: US 9,290,326 B2
(45) Date of Patent: Mar. 22, 2016

(54) MOBILE SUPPORT UNIT FOR A CONVEYOR FOR TRANSFERRING OBJECTS, AND CONVEYOR FOR TRANSFERRING OBJECTS COMPRISING SAID MOBILE SUPPORT UNIT

(71) Applicant: IMMOBILIARE METALPROGETTI SRL, Perugia (IT)

(72) Inventor: Augusto Santicchi, San Sisto (IT)

(73) Assignee: IMMOBILIARE METALPROGETTI SRL (IT)

( * ) Notice: Subject to any disclaimer, the term of this patent is extended or adjusted under 35 U.S.C. 154(b) by 0 days.

(21) Appl. No.: 14/397,392

(22) PCT Filed: Apr. 23, 2013

(86) PCT No.: PCT/IB2013/000759
§ 371 (c)(1),
(2) Date: Oct. 27, 2014

(87) PCT Pub. No.: WO2013/160747
PCT Pub. Date: Oct. 31, 2013

(65) Prior Publication Data
US 2015/0096869 A1 Apr. 9, 2015

(30) Foreign Application Priority Data
Apr. 26, 2012 (IT) .............................. UD2012A0075

(51) Int. Cl.
*B65G 17/20* (2006.01)
*B65G 17/32* (2006.01)

(52) U.S. Cl.
CPC ................ *B65G 17/20* (2013.01); *B65G 17/32* (2013.01); *B65G 2201/0229* (2013.01)

(58) Field of Classification Search
CPC ....................................................... B65G 17/20
USPC ............................ 198/465.4, 678.1, 681, 687
See application file for complete search history.

(56) References Cited

U.S. PATENT DOCUMENTS

| 3,184,042 A |   | 5/1965 | Rutkovsky et al. |
|---|---|---|---|
| 3,269,525 A | * | 8/1966 | Paulski ................ B65G 17/385 198/822 |

(Continued)

FOREIGN PATENT DOCUMENTS

| EP | 0256996 A2 | 2/1988 |
|---|---|---|
| WO | 2005070794 A1 | 8/2005 |

OTHER PUBLICATIONS

International Search Report from PCT Application No. PCT/IB2013/000759 mailed Jul. 10, 2013.

*Primary Examiner* — Douglas Hess
(74) *Attorney, Agent, or Firm* — Calfee, Halter & Griswold LLP

(57) ABSTRACT

Support unit for a conveyor of objects comprising a plurality of support bodies reciprocally pivoted with respect to each other to define a closed ring and suitable to slide in a guide of the conveyor along a closed path, said support bodies each being provided with at least a flat plate and with at least an anchoring base solidly associated to the plate and suitable to support sliding means suitable to slide on the guide. Each plate is provided with opposite pivoting ends configured to pivot, by means of pivoting means, with respective pivoting ends of an adjacent plate which follows and respectively which precedes so as to define the reciprocal connection between the support bodies. Each plate is made of an elastically flexible material at least with respect to its thickness, to adapt to curves defined by the guide.

10 Claims, 7 Drawing Sheets

(56) References Cited

U.S. PATENT DOCUMENTS

| | | | | |
|---|---|---|---|---|
| 4,883,165 A * | 11/1989 | Neiman | ............... | B65G 17/323 104/172.4 |
| 5,072,827 A * | 12/1991 | Santicchi | ............... | B65G 17/20 198/678.1 |
| 5,238,116 A * | 8/1993 | Santicchi | ............... | B65G 17/20 198/463.6 |
| 6,374,992 B1 * | 4/2002 | Simkowski | ............ | B65G 15/14 198/626.1 |
| 6,405,852 B1 * | 6/2002 | Christ | ..................... | B65B 43/52 198/474.1 |
| 6,513,646 B1 * | 2/2003 | Olsen | ..................... | B61B 10/02 198/343.1 |
| 6,615,977 B2 * | 9/2003 | Kilby | ..................... | A21C 13/02 198/838 |
| 6,619,468 B1 * | 9/2003 | Baneck | .................. | B65G 47/61 104/89 |
| 6,681,920 B2 * | 1/2004 | Reisacher | ............. | B65G 47/61 118/502 |
| 6,854,586 B1 * | 2/2005 | VanderMeer | ........ | B65G 37/005 198/436 |
| 6,968,943 B2 * | 11/2005 | Kilby | ..................... | A21C 13/02 198/800 |
| 7,347,321 B1 * | 3/2008 | Sakai | ..................... | B65G 9/008 198/678.1 |
| 7,404,480 B2 * | 7/2008 | Santicchi | ............... | B65G 17/20 198/465.4 |

* cited by examiner

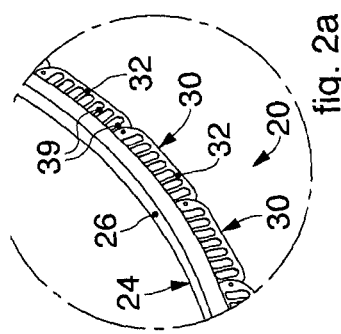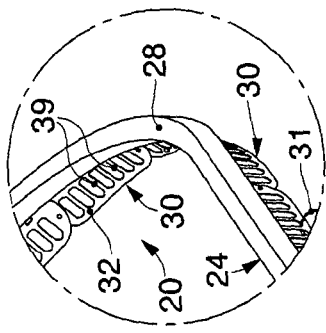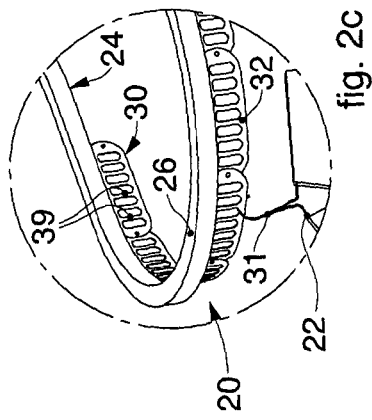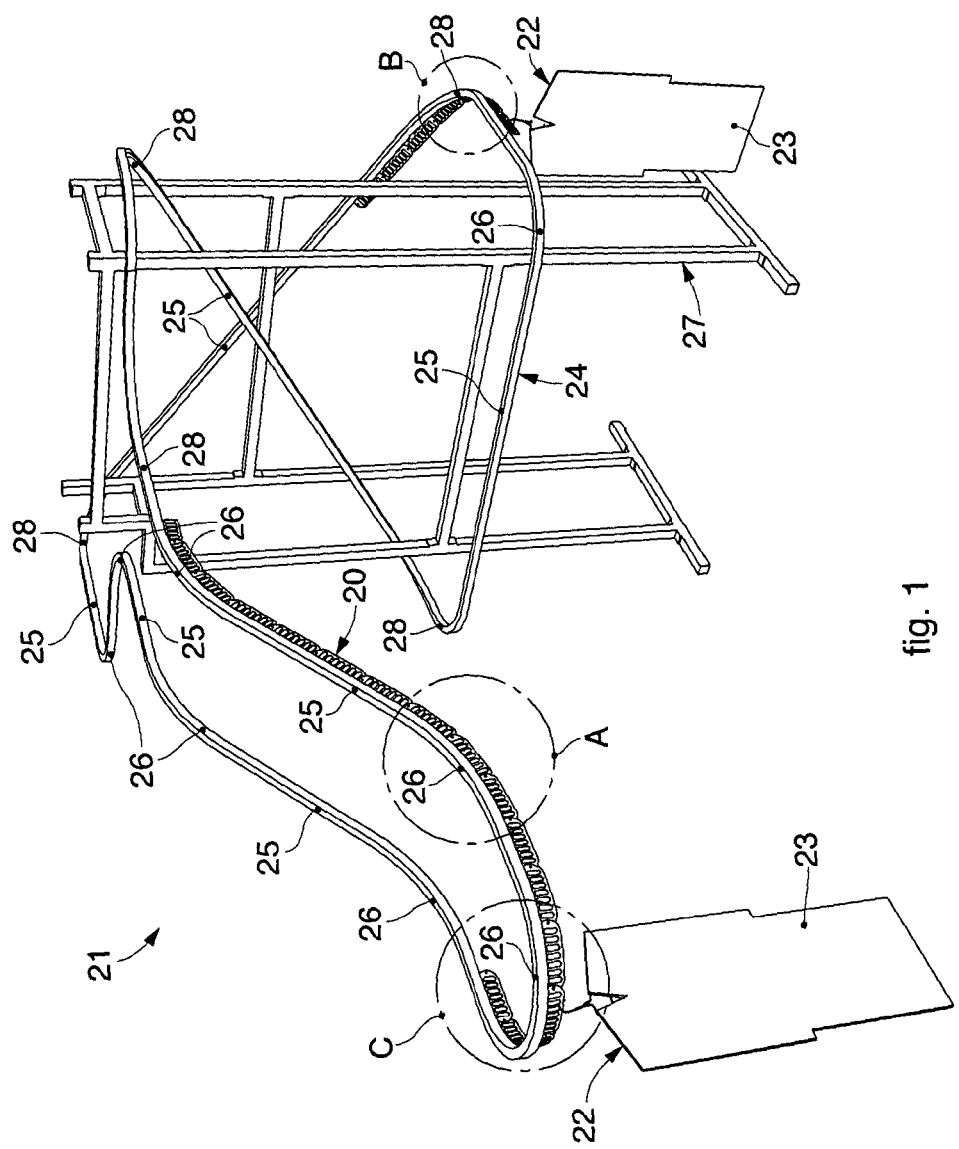

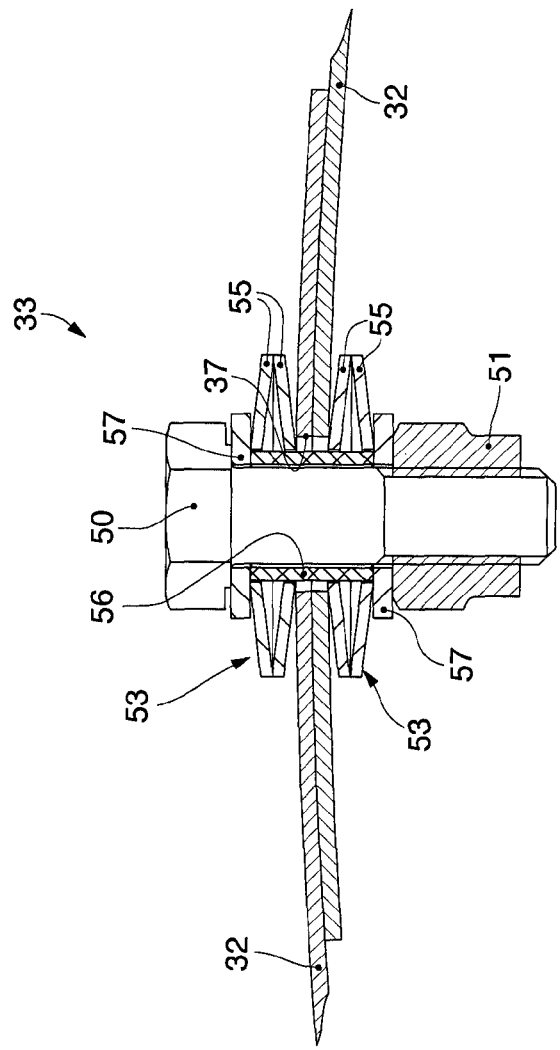
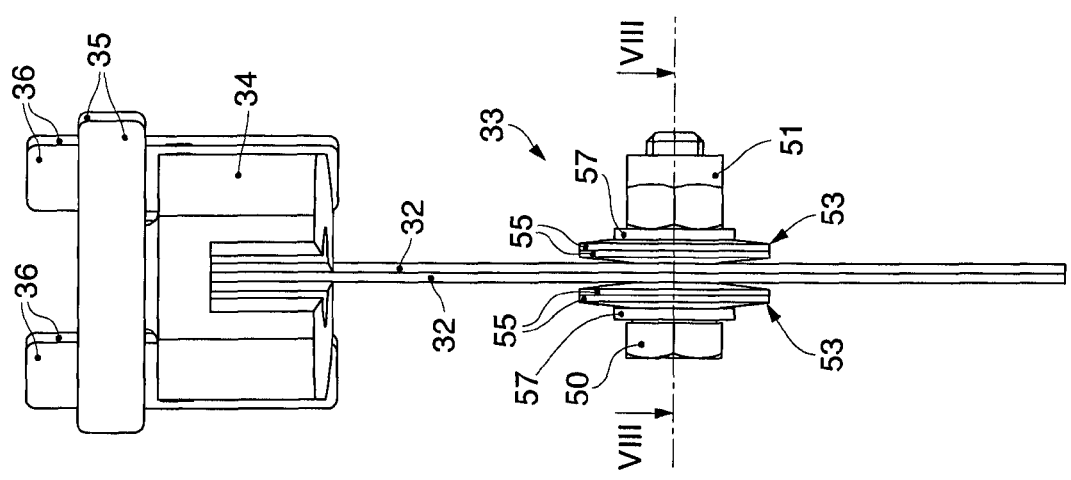

MOBILE SUPPORT UNIT FOR A CONVEYOR FOR TRANSFERRING OBJECTS, AND CONVEYOR FOR TRANSFERRING OBJECTS COMPRISING SAID MOBILE SUPPORT UNIT

CROSS-REFERENCE TO RELATED APPLICATION

This application is the U.S. national phase entry of PCT/IB2013/000759, with an international filing date of 26 Apr. 2013, which claims the benefit of Italian Application Serial No. UD2012A000075, with a filing date of 26 Apr. 2012, the entire disclosures of which are fully incorporated herein by reference.

FIELD OF THE INVENTION

The present invention concerns a mobile support unit for a conveyor used for the temporary storage and movement of objects such as, merely by way of example, articles of clothing, so that they can be picked up.

More precisely, the mobile support unit is applied on closed-ring transfer conveyors and is suitable to slide in guides according to a determinate closed path, in order to make the objects available to be picked up in a determinate zone.

BACKGROUND OF THE INVENTION

Conveyors are known, for the temporary storage and movement of objects in order to make them available to an operator so that they can be selectively picked up in a desired position. One example of such conveyors is described in U.S. Pat. No. 3,184,042.

In particular, conveyors are known for transferring objects, such as for example articles of clothing, comprising a support frame on which a guide is mounted that defines a closed path inside which, or on which, a mobile support unit is made to slide.

The support unit is in a closed ring and is suitable to transport in suspension the objects that are disposed attached thereon.

One type of closed-ring conveyor is known in which the mobile support unit comprises a flexible continuous belt with a closed conformation that extends for the same length as the path defined by the guide. The flexible continuous belt is provided along one side with a plurality of sliding means that allow to support the belt and allow it to slide along the guide by means of drive members.

The flexibility of the belt allows it to perform travels that are curved with respect to its thickness, that is, transverse with respect to its substantially flat faces.

The deformability of the flexible belt is such that it is possible, within certain limits, to oblige the belt to make slanting curves, that is, curves that do not lie on a single plane.

A plurality of through eyelets are made in the thickness of the continuous belt, according to a determinate pitch, in order to attach hooks, support elements or directly objects that are to be transported.

One disadvantage of this known conveyor is that the continuous flexible belt does not allow curves according to a plane that is orthogonal to its thickness, that is, curves of the guides that extend parallel to the flat surfaces of the belt.

A conveyor is also known, provided with a guide defining a path with rectilinear segments and curved segments, and in which the curved segments lie only on one plane. The guide is therefore provided with a plurality of rectilinear and curved segments that are coupled with each other according to desired installation requirements.

The mobile support unit, which is made to slide in the guide, is provided with a plurality of support bodies reciprocally coupled and pivoted to each other, which are moved along the guide by means of the action of one or more electric motors.

Each of the support bodies has an elongated shape, and comprises sliding elements to allow sliding along the guide, and a support element to allow to support one or more objects.

Each support element comprises a shaped plate provided with a plurality of through eyelets to attach and anchor the objects.

The sliding elements are associated to the plate in proximity to an external perimeter edge thereof, and are provided with an anchoring base, for the reciprocal anchoring of the sliding elements to the plate, and with a plurality of rollers which are pivoted idly to the anchoring base and are suitable to slide on the guide.

Each of the anchoring bases is provided, on two opposite sides, with hinging means to allow the reciprocal pivoting of several sliding elements.

The hinging means allow the reciprocal hinging both with respect to axes tangent to the path of the guide, and also with respect to axes orthogonal thereto.

One disadvantage connected to the configuration of the hinging means is that the support bodies cannot perform slanting curves but can only follow a path with segments of curve lying only on one plane.

Another disadvantage is the bulk and high position with respect to the plates of the pivoting means, which limit the overall delivery capacity of the conveyor, given that the plates, to prevent a scissor effect on the objects that are associated with them, must be less long than the anchoring base.

In order to reduce the radius of curvature of the guide, the length of each support body must be reduced, and hence the overall number of support bodies must be increased. Furthermore, the pivoting means are subjected to wear, which causes a variation in the overall length of the support unit which causes problems of malfunctioning of the whole conveyor with possible dangerous conditions for the users.

Another disadvantage concerns the lack of stable connection between the support bodies, and this can lead to an uneven movement, which could affect the sliding and level of wear of the guide and of the sliding elements.

Another disadvantage is due to the constructional complexity of the parts that make up the support unit, and in particular the pivoting means.

One purpose of the present invention is to obtain a support unit for a conveyor of objects that allows to adapt the configuration of the latter to the particular requirements of installation space and therefore also allows to obtain differences in height, on vertical or subvertical planes, in limited spaces, and also according to slanting curves.

Another purpose of the present invention is to obtain a support unit that is simple and economical.

Another purpose of the present invention is to obtain a support unit that is stable, safe and resistant to stresses.

Another purpose of the present invention is to obtain a support unit that reduces the level of wear of the guide and the sliding elements.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a support unit that overcomes the limitations of the state of the art and eliminates the defects therein, is used in conveyors of objects for their temporary storage and movement, in order to pick them up.

The support unit comprises a plurality of support bodies reciprocally pivoted to each other so as to define a closed ring and suitable to slide along a closed path defined by a guide of the conveyor. The support bodies are each provided with at least a flat plate and at least an anchoring base.

The plate can be provided with through eyelets to allow to attach objects. The anchoring base is solidly associated with the plate and is suitable to support sliding means suitable to slide on the guide.

According to one characteristic of the present invention, each of the plates has opposite pivoting ends configured to pivot, by means of pivoting means, with respective pivoting ends of an adjacent plate which follows and respectively precedes, to define the reciprocal connection of the support bodies.

In this way, by moving the position of the pivoting means with respect to what happens in the state of the art, directly to the level of the plates, it is possible to increase the conveyor's capacity and to reduce the effects of interference between one plate and another, which resulted in a scissor effect on the objects transported.

According to another feature of the invention, each plate is made of an elastically flexible material at least with respect to its thickness, in order to adapt to curves defined by the guide. The flexibility of the plate allows it to adapt to the particular set paths which can comprise also curves of the slanting type, and/or changes in direction inclined with respect to the horizontal, which it was not possible to obtain with known systems.

According to another feature of the invention, the plate extends longitudinally for a determinate length and the anchoring base extends longitudinally for a given longitudinal bulk, smaller than the length of the plate.

This configuration allows to define reduced radiuses of curvature of the guide, reducing the overall bulk needed for the conveyor, given that the anchoring bases of two adjacent plates do not interfere with each other.

Furthermore, the position of the pivoting point between the plates allows to use substantially the whole plate for the attachment of the objects that have to be transported and stored.

Moreover, since the hinge is used only for curves on the vertical plane, which are normally less frequent than those on the horizontal plane, the wear over time is less accentuated and therefore negligible.

According to another characteristic of the present invention, the plates are pivoted to each other by locating the pivoting ends adjacent to each other.

Infact, each plate is staggered from the adjacent one by a distance substantially equal to the thickness of the plate.

According to another secondary characteristic of the present invention, at least one of the pivoting ends of each plate comprises two prongs of a fork which is able to couple with the pivoting end of the subsequent plate.

In this case, the pivoting ends of each plate can be specular or different from each other. More precisely, both ends can be forked, or only one of the two can be forked.

According to another form of embodiment of the present invention, the pivoting means between consecutive plates comprise pivoting and connection elements suitable to be inserted into through holes made in the pivoting ends of the plates, and elastic means configured to keep the adjacent surfaces of the pivoting ends in contact with each other during use. This particular configuration allows to obtain a support unit defining a support band for the articles that is substantially continuous, and at the same time allows curves to be made.

According to a variant, the pivoting means between the plates comprise a plurality of through holes made at each pivoting end.

According to another variant, the pivoting means between the plates comprise an eyelet made at each pivoting end.

According to another variant, the pivoting means between the plates comprise a plurality of eyelets made at each pivoting end.

The presence of different variants confers greater versatility on the support bodies, allowing to adjust on each occasion, according to need, the position of the pivoting point. The support bodies can thus adapt to the specific geometric conformations of the guide on which they will be installed.

The present invention also concerns the conveyor for transferring objects that comprises a support unit of the type described above.

Given the particular conformation of the support unit, the conveyor can comprise a guide that comprises at least rectilinear segments, segments with a flat curve and segments with a slanting curve so as to define sliding paths for the objects transported that are complex and that could not be provided with solutions known in the state of the art.

This configuration of the guide allows to locate the conveyor on several heights and hence to optimize the storage space.

BRIEF DESCRIPTION OF THE DRAWINGS

These and other characteristics of the present invention will become apparent from the following description of one form of embodiment, given as a non-restrictive example with reference to the attached drawings wherein:

FIG. 1 is a schematic representation of a conveyor for articles of clothing with which a mobile support unit according to the present invention is associated;

FIG. 2a is an enlarged view of detail A in FIG. 1;

FIG. 2b is an enlarged view of detail B in FIG. 1;

FIG. 2c is an enlarged view of detail C in FIG. 1;

FIG. 7 is a second variant of FIG. 5;

FIG. 8 is a section view from VIII to VIII of FIG. 7;

Figure 3:
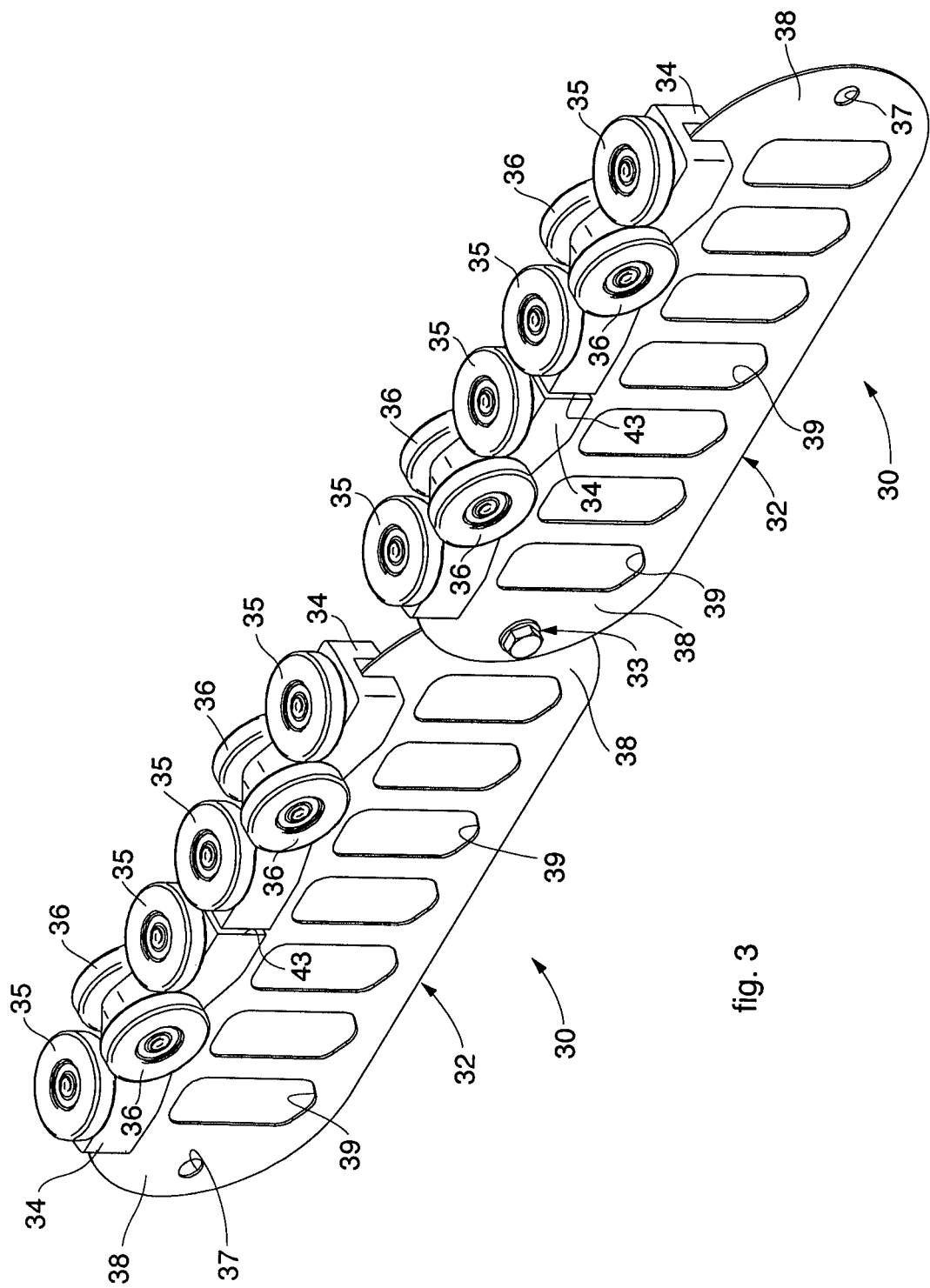
FIG. 3 is a perspective view of a part of a support unit according to the present invention.
Figure 4:
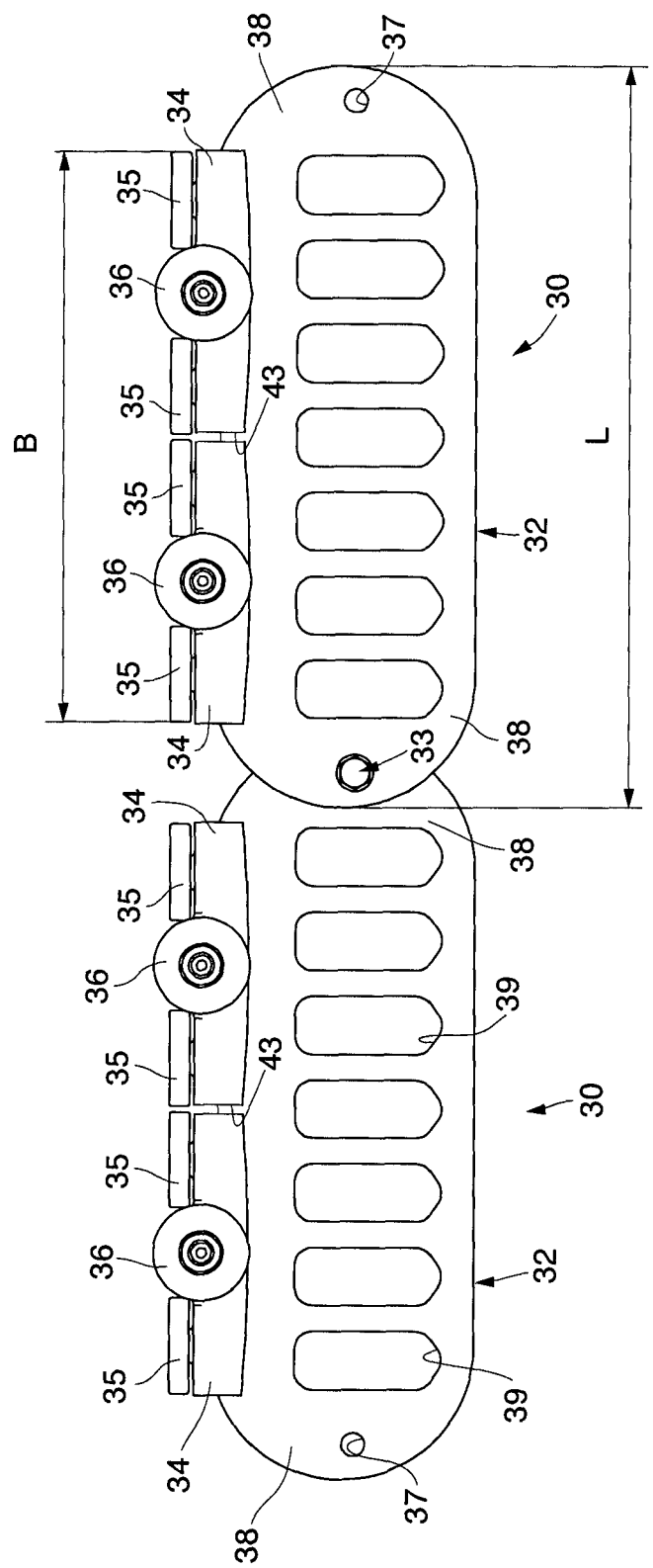
FIG. 4 is a front view of FIG. 3.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, a support unit 20 is only partly shown, associated with a conveyor 21 for the temporary storage, movement and picking up of objects, in this case clothes hangers 22 on which articles of clothing 23 are disposed.

The conveyor 21 comprises a support frame 27 on which a guide 24 is mounted that defines a closed path for the sliding therein of the support unit 20 according to the present invention.

The guide 24 in this case comprises rectilinear segments 25, segments with a flat curve 26 (FIGS. 2a and 2c), that is, in which the curve lies on a single plane, and segments with a slanting curve 28, that is, with a curve not contained in a plane (FIG. 2b).

The segments with a flat curve 26 have a curve that extends on a plane substantially orthogonal to the plane on which the support unit 20 lies and slides (FIG. 2c), or on a plane substantially parallel to that on which the support unit 20 lies and slides (FIG. 2a).

In this case, the segments of flat curve 26 have a curve that lies on a substantially vertical plane (FIG. 2a) and on a substantially horizontal plane (FIG. 2c).

The rectilinear segments 25, the segments with flat curve 26 and the segments with slanting curve 28 are reciprocally coupled with each other to define the closed path that the support unit 20 has to follow.

The particular conformation of the support unit 20, as described in more detail hereafter, allows to perform paths both with curves lying on a plane and also with slanting curves, with variable inclinations with respect to the horizontal. This allows to give the conveyor 21 maximum versatility with respect to the requirements of space and travel as necessary.

The support unit 20 extends in a closed ring substantially for the same extension as the guide 24, and is provided with a plurality of support bodies 30, reciprocally pivoted to each other.

Each of the support bodies 30 has the function of supporting in this case a plurality of hooks 31, each belonging to a clothes hanger 22.

Each support body 30 comprises a flat plate 32 (FIGS. 2-13), elongated, provided with perimeter edges that follow a linear peripheral profile, in the upper and lower central part, and semi-circular at the ends.

Figure 5:
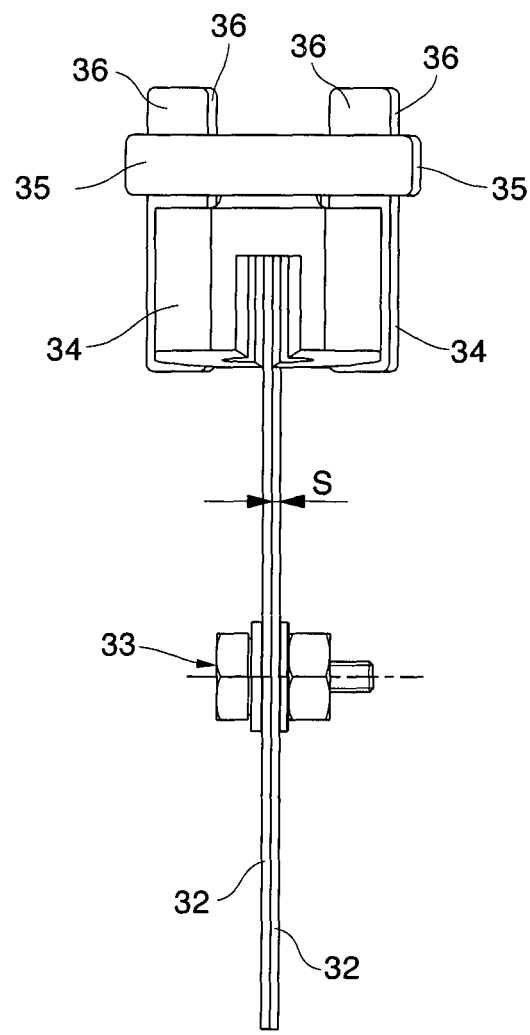
FIG. 5 is a lateral view of FIG. 4.

The plate 32 is made of elastically flexible material, at least with respect to its thickness S (FIG. 5).

The plate 32 is provided with a plurality of through eyelets 39 (FIG. 4) inside each of which, in the case shown in the example of FIG. 1, the hook 31 of a clothes hanger 22 is inserted.

More specifically, the plate 32 is provided with opposite pivoting ends 38 (FIG. 3) in correspondence with which pivoting is determined with two support bodies 30. In particular, each pivoting end 38 is provided with a through hole 37 (FIGS. 3 and 4) suitable to allow the pivoting of one plate 32 with respect to the other by pivoting means 33. The pivoting means 33 can include screws, bolts, rivets, pins or suchlike.

Thanks to the presence of the pivoting holes made directly in the plates 32, and thanks to the flexibility of the plates 32, the pivoting axis is displaced downward with respect to the guide 24, compared with what happens with individual bodies in the state of the art, in practice reproducing a situation analogous to the continuous belt, but without its disadvantages. The lower position of the axis allows to curve on a plane, avoiding the scissor effect between two adjacent plates, or reducing it to a minimum, while the flexibility and overlapping in correspondence with the ends of the plates 32 allows to perform both curves on the plane and slanting curves, therefore inclined with respect to two planes.

According to a variant form of embodiment of the invention (FIGS. 7 and 8), the pivoting means 33 between two adjacent plates 32 comprise pivoting and connection elements, in this case a screw 50 and a nut 51, which provide both to keep the two plates 32 adjacent with respect to each other, and also to pivot them reciprocally. In other forms of embodiment it may be provided that the pivoting and connection elements comprise rivets, pins, or suchlike.

The pivoting means 33 also comprise elastic means 53 configured to keep the two plates 32 adjacent to each other, at least in correspondence to their through hole 37, and during the use of the support unit 20.

In the case shown here, the elastic means 53 comprise pairs of cup springs 55 reciprocally coupled with each other with opposite concavities on the external surfaces of each of the two plates 32. The cup springs 55 are associated with the plates 32 so as to dispose their rounded part facing toward the external surface of the plate 32. This allows to prevent the cup springs 55 from impeding the flexibility of the plates 32 during the curving thereof.

A bushing 56 is inserted into the through hole 37 of the two plates 32, suitable to reduce the wear between the parts in movement during use.

Between the cup springs 55 and respectively the head of the screw 50 and the nut 51, a washer 57 is interposed, with the function of preventing the screw 50 and the nut 51 from coming undone.

The particular assembly conformation described with reference to FIGS. 7 and 8, that is, with the provision of the cup springs 55 in correspondence with the pivoting ends 38 between the plates 32, allows to define a support unit 20 with a behavior very similar to that of a continuous band, as described with reference to the state of the art, but at the same time allows to obtain a curve also on planes substantially parallel to the curve itself. At least one anchoring base 34 is solidly associated with each plate 32, in this case two anchoring bases 34.

The two anchoring bases 34 of each plate 32 are distanced from each other to define an interspace 43 (FIG. 3) that is disposed substantially in proximity to the center line of the plate 32. The interspace 43 allows at least in this zone a flexion of the plate 32 with respect to its thickness S, which allows the support unit 20 to adapt to the path defined by the guide 24.

Each anchoring base 34 is provided with a plurality of sliding means, in this case rollers, pivoted idly to the anchoring base 34.

In this case, the sliding means comprise first rollers 35 disposed orthogonal with respect to the plane defined by the plate 32, and pairs of second rollers 36 disposed substantially parallel to the plane of the plate 32.

The plate 32 extends longitudinally for a determinate length L (FIG. 4), while the two anchoring bases 34 associated with each plate 32 are contained in a longitudinal bulk B, which is less than the length L.

In particular, the longitudinal bulk B is such that the pivoting ends 38 of the plate 32 protrude laterally with respect to the longitudinal extension of the anchoring base 34. This particular conformation allows to be able to rotate two support bodies 30 reciprocally with respect to each other, for example due to an accentuated curve of the guide 24, without problems of interference between one anchoring base 34 and that of the plate 32 before or after.

Furthermore, the fact that pivoting is provided in correspondence with the plate 32 instead of in correspondence with the anchoring base 34, as described in the known solutions, allows to define very high angles of reciprocal rotation between one support body 30 and the other, which could not be obtained in the state of the art.

Given that the length L is greater than the longitudinal bulk B, unlike what happened in the state of the art, it is also possible to provide a greater number of through eyelets 39 to hang the clothes hangers 22 on, with the advantage of a greater transport capacity for the conveyor 21.

With reference to FIG. 5, which shows lateral views of two consecutive support bodies 30, the pivoting of two plates 32 occurs by disposing them adjacent and partly overlapping, and connecting them reciprocally by the pivoting means 33.

Figure 6:
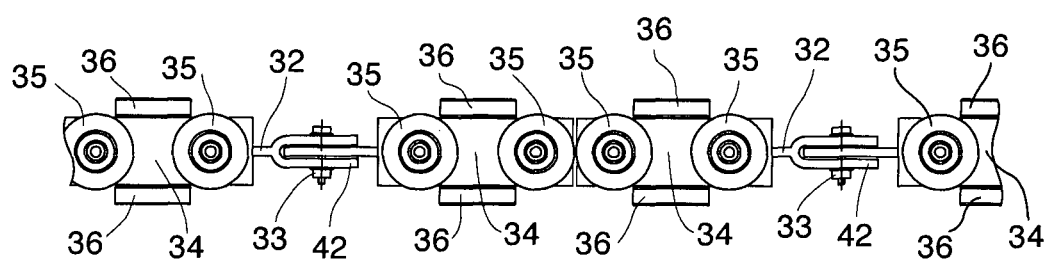
FIG. 6 is a first variant of FIG. 5.
Figure 9:
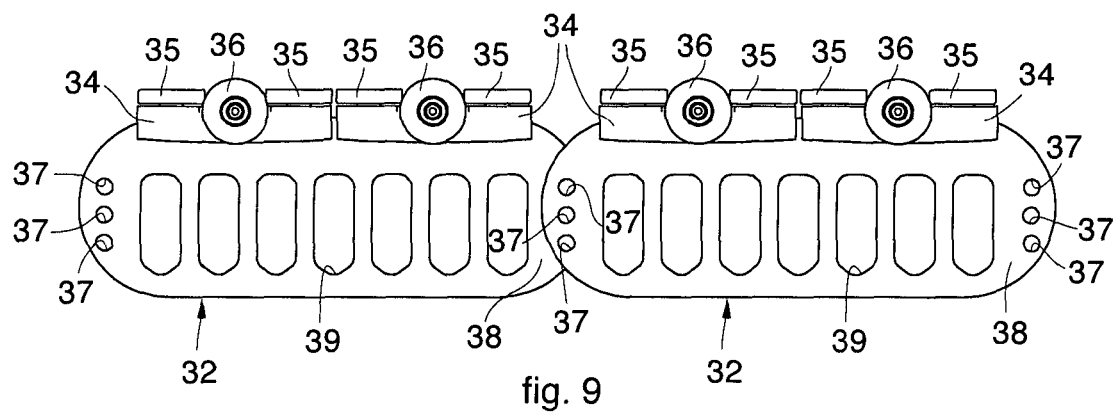
FIG. 9 is a first variant of FIG. 4.
Figure 10:
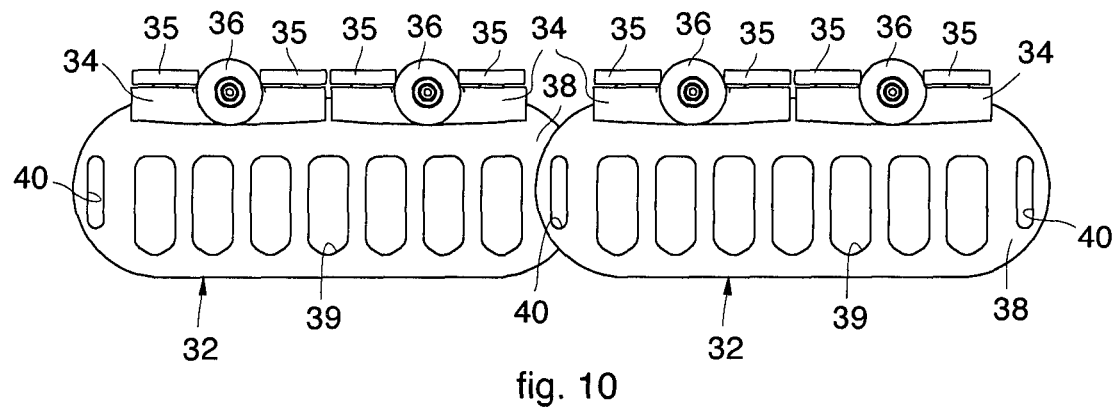
FIG. 10 is a second variant of FIG. 4.
Figure 11:
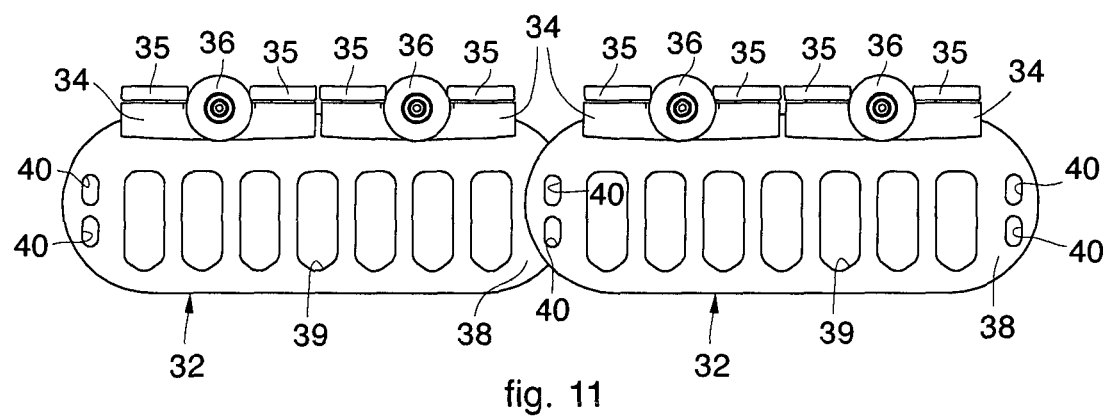
FIG. 11 is a third variant of FIG. 4.

According to a variant form of embodiment, at least one of the two pivoting ends 38 of the plate 32 can comprise two prongs 41 of a fork 42, which is coupled with the pivoting end 38 of the subsequent plate as shown in FIG. 6.

According to a variant, (FIG. 9), the support plate 32 is provided at each pivoting end 38 with a plurality of through holes 37 for the insertion of the pivoting means between the two plates 32.

According to another variant (FIG. 10), an eyelet 40 replaces the through hole 37, to allow a greater reciprocal angular travel between the support bodies 30.

According to another variant (FIG. 11), a plurality of eyelets 40 replace the through hole 37.

Figure 12:
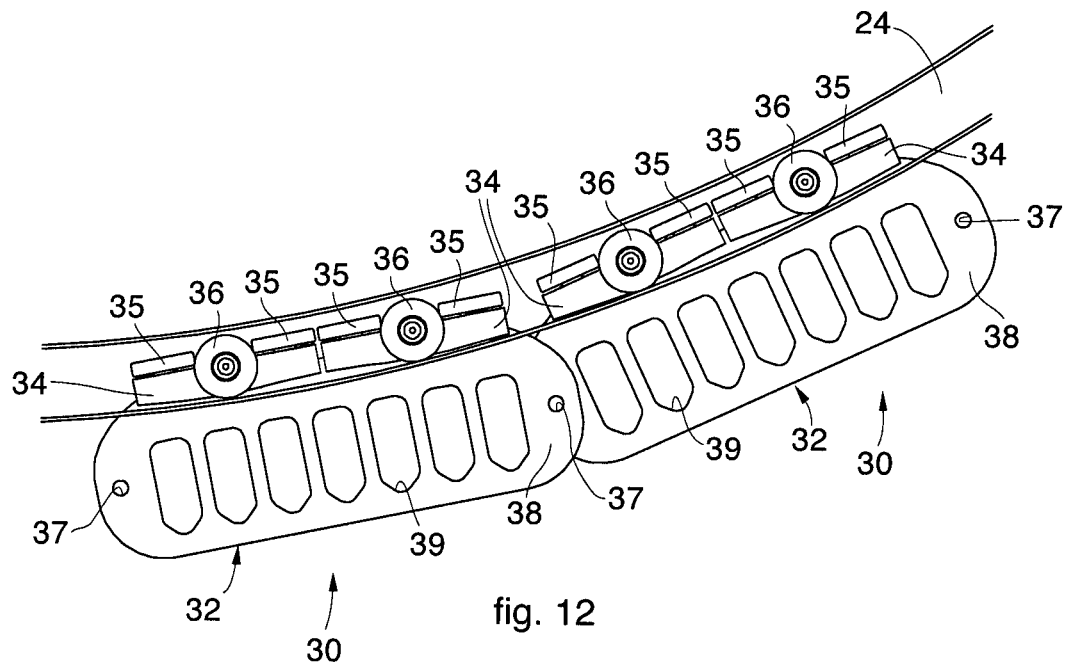
FIG. 12 is a partly sectioned representation in which the support unit in FIG. 4 is associated with the conveyor in FIG. 1, in a first position.
Figure 13:
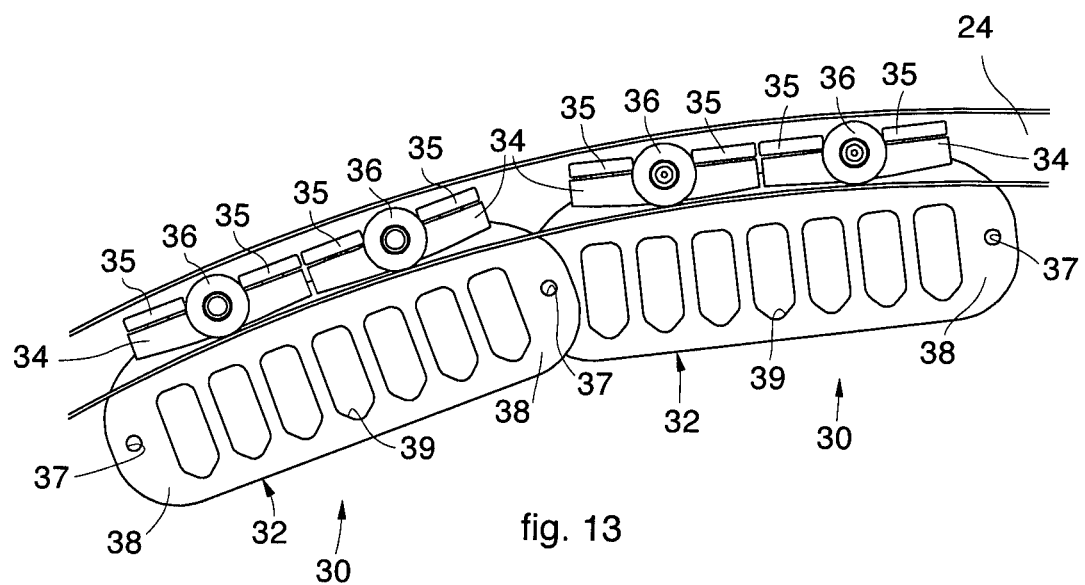
FIG. 13 is a partly sectioned representation in which the support unit in FIG. 4 is associated with the conveyor in FIG. 1, in a second position.

FIGS. 12 and 13 show two adjacent support bodies 30 disposed along a curved segment of the guide 24.

The particular conformation of the support unit 20, and in particular the disposition of the pivoting means 33 in the plates 32, and the flexibility of the latter, allow to obtain slanting paths, given that, as shown in FIG. 2, the plate 32 can both curve, thanks to its flexibility, with respect to its normal flat condition, and can also partly twist with respect to the direction of feed of the unit. The presence of the pivoting means 33 instead allows to perform curves inclined with respect to the horizontal.

It is clear that modifications and/or additions of parts may be made to the support unit 20 as described heretofore, without departing from the field and scope of the present invention.

It is also clear that, although the present invention has been described with reference to some specific examples, a person of skill in the art shall certainly be able to achieve many other equivalent forms of support unit, having the characteristics as set forth in the claims and hence all coming within the field of protection defined thereby.

The invention claimed is:

1. A support unit for sliding on a curved guide of a conveyor comprising:
    a plurality of pivoting devices in communication with each other, and
    a plurality of support bodies each in communication with at least one pivoting device and comprising:
        a plate having two pivoting ends,
        a sliding device configured to engage and slide on the curved guide of the conveyor, and
        an anchoring base connecting the plate to the sliding device,
    wherein a pivoting end of a plate of a support body is pivotally connected by the pivoting device to a pivoting end of the plate of the adjacent support body and plurality of connected support bodies define a closed ring, and
    wherein the plate is made of a flexible material to adapt the curved guide.

2. The support unit of claim 1 wherein the adjacent plates are partially overlapped.

3. The support unit of claim 1 wherein the length of the plate is larger than the length of the anchoring base.

4. The support unit of claim 1 wherein each support body comprises at least two anchoring bases distanced each other by an interspace allowing the plates to bend.

5. The support unit of claim 1 wherein at least one of the pivoting ends of the plate comprises a fork having two prongs to couple with the pivoting end of the adjacent plate.

6. The support unit of claim 1 wherein the pivoting devices comprise:
    pivoting and connection elements inserted through the pivoting ends of the adjacent plates, and
    elastic devices to maintain the surfaces of the adjacent plates in contact.

7. The support unit of claim 6 wherein the elastic devices comprise cup springs.

8. The support unit of claim 6 wherein the pivoting devices comprise a bushing inserting through the pivoting ends of the adjacent plates.

9. A conveyor comprising:
    a support unit comprising:
        a plurality of pivoting devices in communication with each other, and
        a plurality of support bodies each in communication with at least one pivoting device and comprising:
            a plate having two pivoting ends,
            a sliding device configured to engage and slide on the conveyor, and
            an anchoring base connecting the plate to the sliding device,
        wherein a pivoting end of a plate of a support body is pivotally connected by the pivoting device to a pivoting end of the plate of the adjacent support body and plurality of connected support bodies define a closed ring,
        wherein the plate is made of a flexible material to adapt to the conveyor.

10. The conveyor of claim 9 further comprising a guide having rectilinear segments, flat curve segments, and slanting curve segments, and defining a sliding path for the support unit.

* * * * *